US009549496B2

(12) United States Patent
Sudbrink et al.

(10) Patent No.: US 9,549,496 B2
(45) Date of Patent: Jan. 24, 2017

(54) TILLAGE IMPLEMENT WITH FOLDABLE FRAME

(71) Applicant: CNH Industrial America LLC, New Holland, PA (US)

(72) Inventors: Matthew R. Sudbrink, Metamora (IL); Matthew P. Morgan, Peoria (IL); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/489,998

(22) Filed: Sep. 18, 2014

(65) Prior Publication Data

US 2015/0156955 A1 Jun. 11, 2015

Related U.S. Application Data

(60) Provisional application No. 61/914,502, filed on Dec. 11, 2013.

(51) Int. Cl.
  *A01B 73/06* (2006.01)
  *A01B 29/04* (2006.01)
  *A01B 73/04* (2006.01)

(52) U.S. Cl.
  CPC .......... *A01B 29/048* (2013.01); *A01B 73/044* (2013.01); *A01B 73/065* (2013.01)

(58) Field of Classification Search
  CPC ..... A01B 73/02; A01B 73/048; A01B 73/065; A01B 73/005; A01B 73/00; A01B 73/06; A01B 73/067
  See application file for complete search history.

(56) References Cited

U.S. PATENT DOCUMENTS

| | | | | |
|---|---|---|---|---|
| 4,418,762 A * | 12/1983 | Page | A01B 73/02 | 172/311 |
| 6,141,612 A * | 10/2000 | Flamme | A01B 63/1117 | 111/177 |
| 6,415,873 B1 * | 7/2002 | Hudgins | A01B 35/16 | 172/311 |
| 7,581,597 B2 * | 9/2009 | Neudorf | A01B 73/067 | 172/1 |
| 8,141,653 B2 * | 3/2012 | Ryder | A01B 73/067 | 172/311 |
| 8,567,517 B2 * | 10/2013 | Friggstad | A01B 63/32 | 172/140 |
| 2007/0240889 A1 * | 10/2007 | Neudorf | A01B 73/067 | 172/311 |

(Continued)

*Primary Examiner* — Matthew D Troutman
(74) *Attorney, Agent, or Firm* — Rebecca L. Henkel; Rickard K. DeMille (57) ABSTRACT

An agricultural tillage implement including a main frame section having a pull hitch tube extending in a travel direction, and a tool bar coupled with and extending transverse to the pull hitch tube, and a plurality of pivotally coupled wing sections coupled with the main frame section. The plurality of pivotally coupled wing sections including a first wing section and an adjacent second wing section. Each of the plurality of wing sections have at least one pivotal tool frame. The pivotal tool frame of the first wing section is foldable upward at a first angle, and the pivotal tool frame of the second wing section being foldable upward to a second angle. The first angle and the second angle being different from each other.

17 Claims, 9 Drawing Sheets

(56) References Cited

U.S. PATENT DOCUMENTS

| | | | | |
|---|---|---|---|---|
| 2011/0284252 A1* | 11/2011 | Friggstad | ............... | A01B 63/32 |
| | | | | 172/310 |
| 2011/0290513 A1* | 12/2011 | Yuen | .................... | A01B 73/048 |
| | | | | 172/459 |
| 2014/0034342 A1* | 2/2014 | Friggstad | ............. | A01B 73/067 |
| | | | | 172/663 |
| 2014/0069670 A1* | 3/2014 | Friesen | .................. | A01B 73/02 |
| | | | | 172/311 |

* cited by examiner

TILLAGE IMPLEMENT WITH FOLDABLE FRAME

CROSS REFERENCE TO RELATED APPLICATIONS

This is a non-provisional application based upon U.S. provisional patent application Ser. No. 61/914,502 entitled "TILLAGE IMPLEMENT WITH FOLDABLE SHANK FRAME", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to keep the transport size of the implement within manageable limits. It also becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

SUMMARY OF THE INVENTION

The present invention provides a tillage implement with wing sections that are foldable to a compact transport position.

The invention in one form is directed to an agricultural tillage implement including a main frame section having a pull hitch tube extending in a travel direction, and a tool bar coupled with and extending transverse to the pull hitch tube, and a plurality of pivotally coupled wing sections coupled with the main frame section. The plurality of pivotally coupled wing sections including a first wing section and an adjacent second wing section. Each of the plurality of wing sections have at least one pivotal tool frame. The pivotal tool frame of the first wing section is foldable upward at a first angle, and the pivotal tool frame of the second wing section being foldable upward to a second angle. The first angle and the second angle being different from each other.

The invention in another form is directed to a series of at least two coupled wing sections for an agricultural implement. The series of at least two coupled wing sections including a first wing section, and a second wing section pivotally coupled to the first wing section. Both the first wing section and the second wing section each having at least one pivotal tool frame. The pivotal tool frame of the first wing section being folded upward at a first angle, and the pivotal tool frame of the second wing section being folded upward at a second angle, the first angle and the second angle being different from each other.

The invention in yet another form is directed to a method of folding a multi-section agricultural implement from an operating position to a transport position. The method including the steps of: folding a pivotal tool frame of a first wing section to a first angle, and folding a pivotal tool frame of a second wing section to a second angle. The second wing section being pivotally coupled to the first wing section. The first angle and the second angle being different by a sufficient amount such that the pivotal tool frame of the first wing section and the pivotal tool frame of the second wing section do not interfere with each other when the first wing section and the second wing section are pivoted upwards toward each other.

An advantage of the present invention is that the tool frames of each section are folded so as to not interfere with adjacent tool frames.

Another advantage is that the operating depth of the shank frame can be easily set using gauge wheel assemblies at the front of the shank frame.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
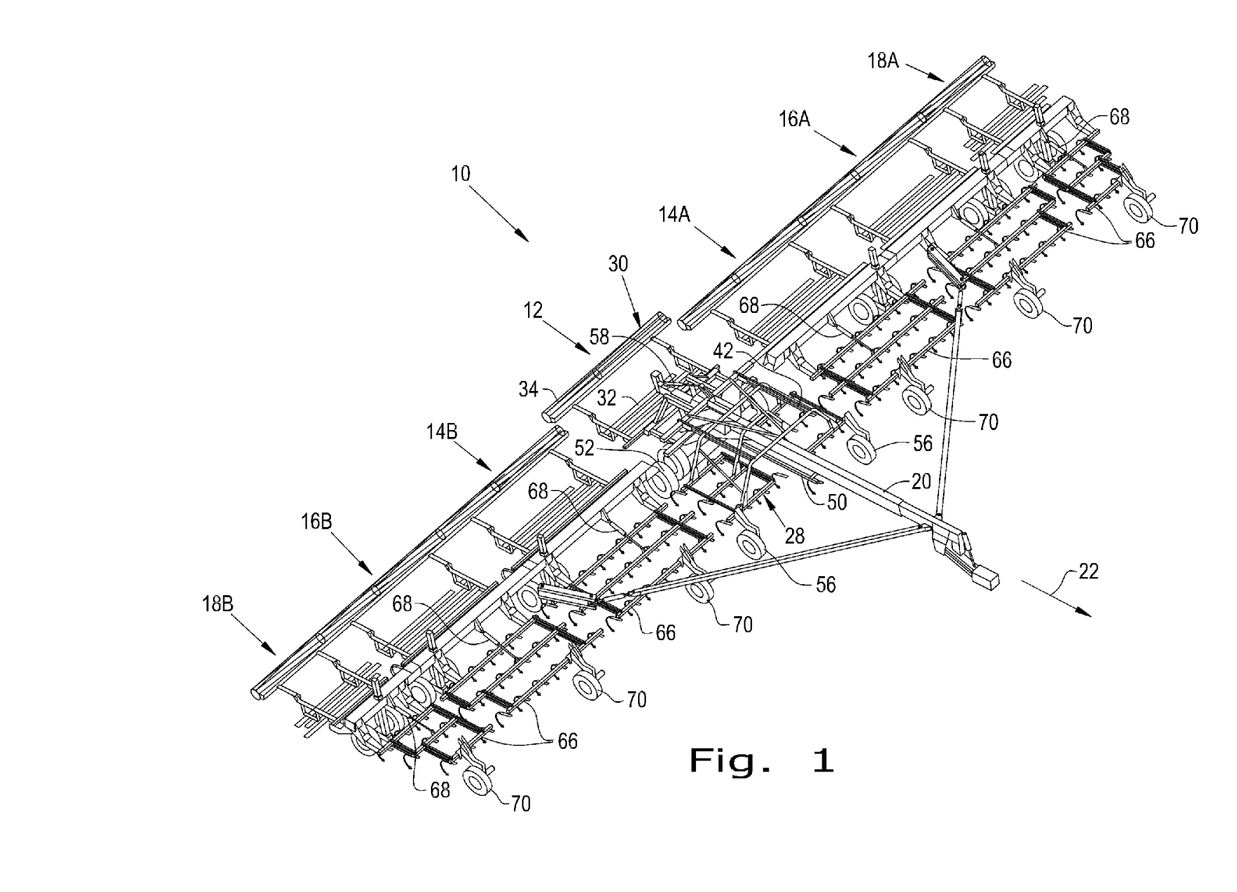
FIG. 1 is a top perspective view of an embodiment of an agricultural tillage implement of the present invention, in the form of a field cultivator.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Figure 2:
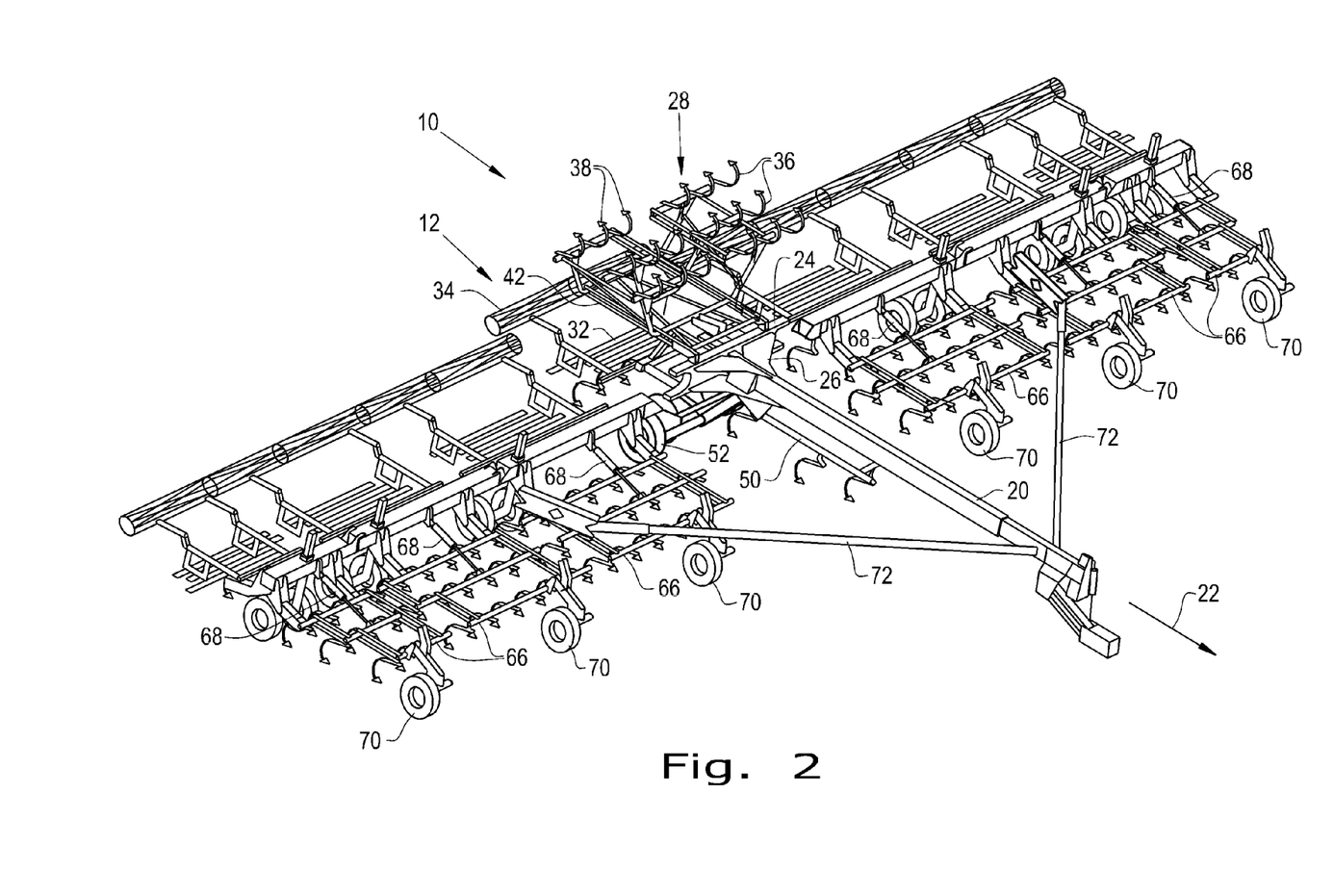
FIG. 2 is the same top perspective view shown in FIG. 1, with the center shank frame folded to a transport position.
Figure 3:
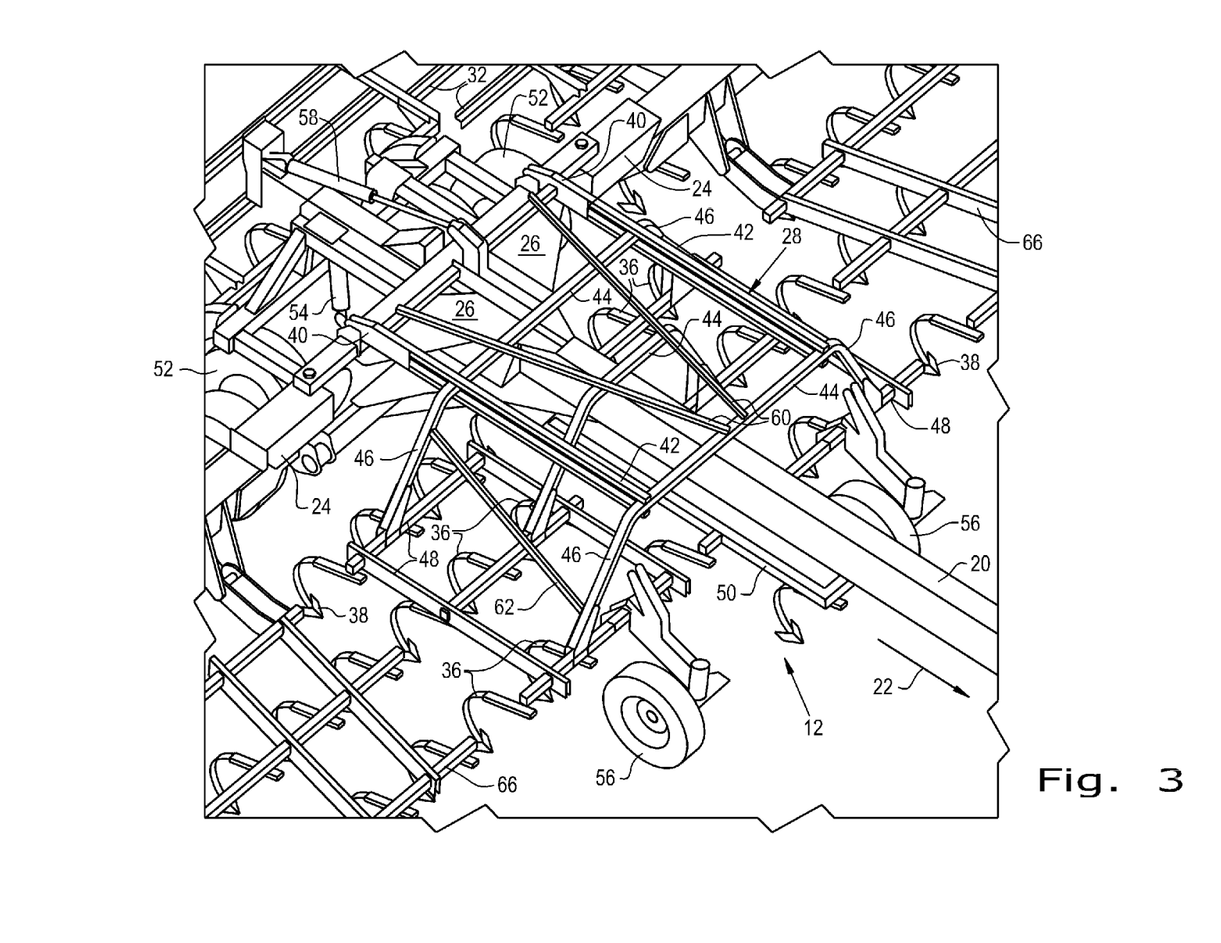
FIG. 3 is a top perspective view of the center frame section with the center shank frame in the operating position.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket 34 which coact with each other to finish the soil. However, rear auxiliary implement can be differently configured, such as a spike tooth drag, cultivator shanks, etc.

Figure 4:
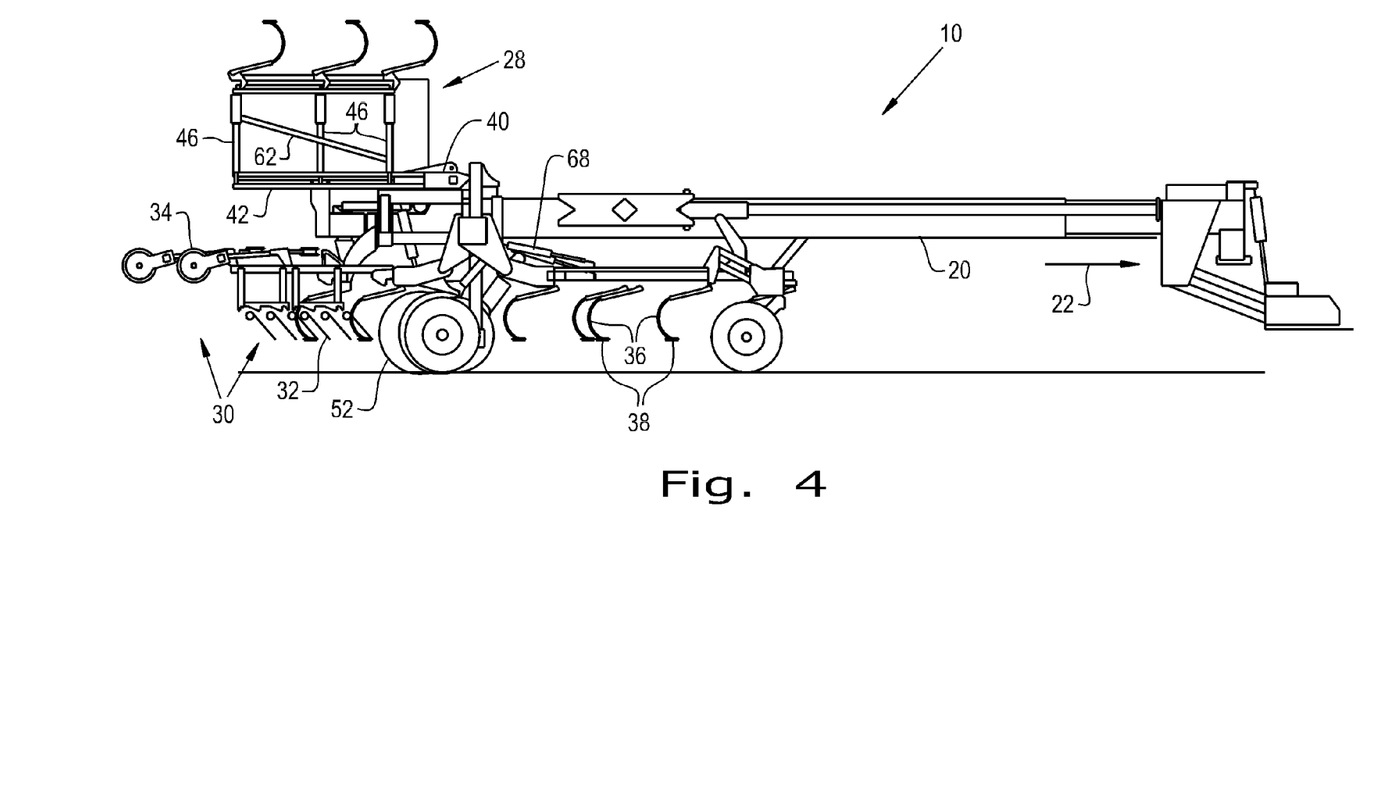
FIG. 4 is a side view of the tillage implement shown in FIGS. 1-3, with the center shank frame in the transport position.
Figure 5:
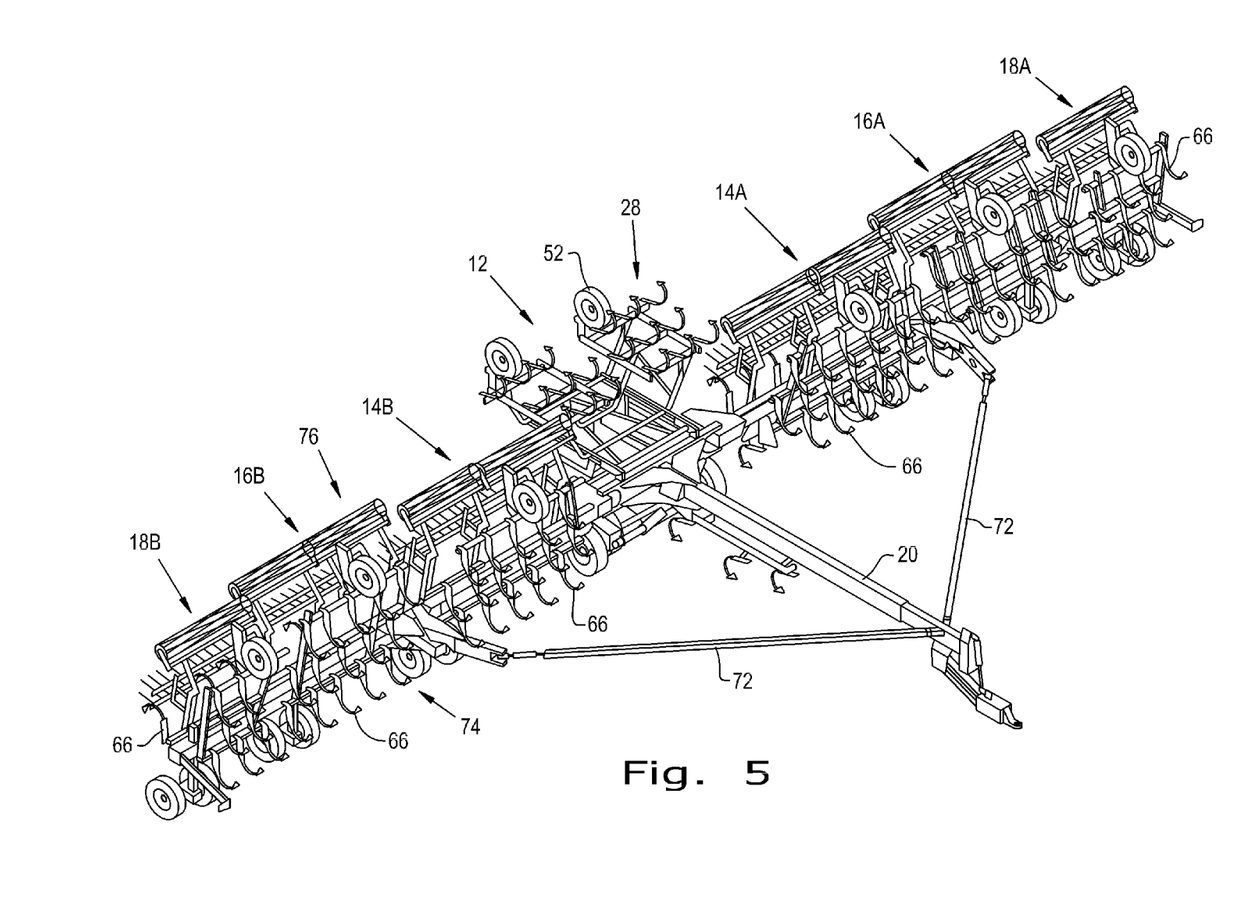
FIG. 5 is a top perspective view of the tillage implement shown in FIGS. 1-4, with the center shank frame folded rearward to a transport position and the wing section shank frames folded upwards to a transport position.

Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to level shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. In the present invention hydraulic cylinder 58 is fully extended; however, it is also contemplated that hydraulic cylinder 58 may optionally be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

Figure 6:
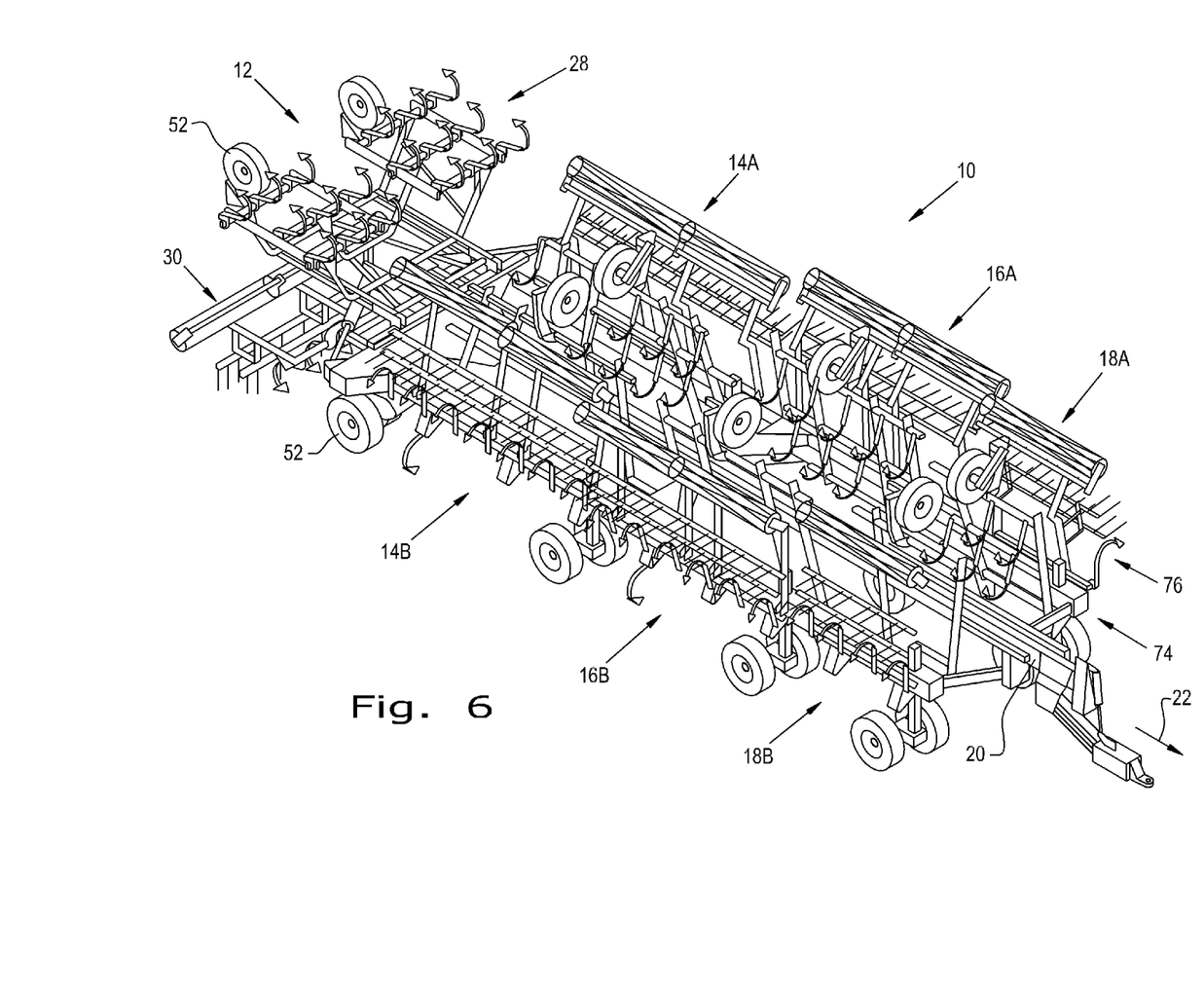
FIG. 6 is a top perspective view of the tillage implement shown in FIGS. 1-5, with the wing sections folded forward to a transport position and illustrating the mismatched fold angles of the sections.
Figure 7:
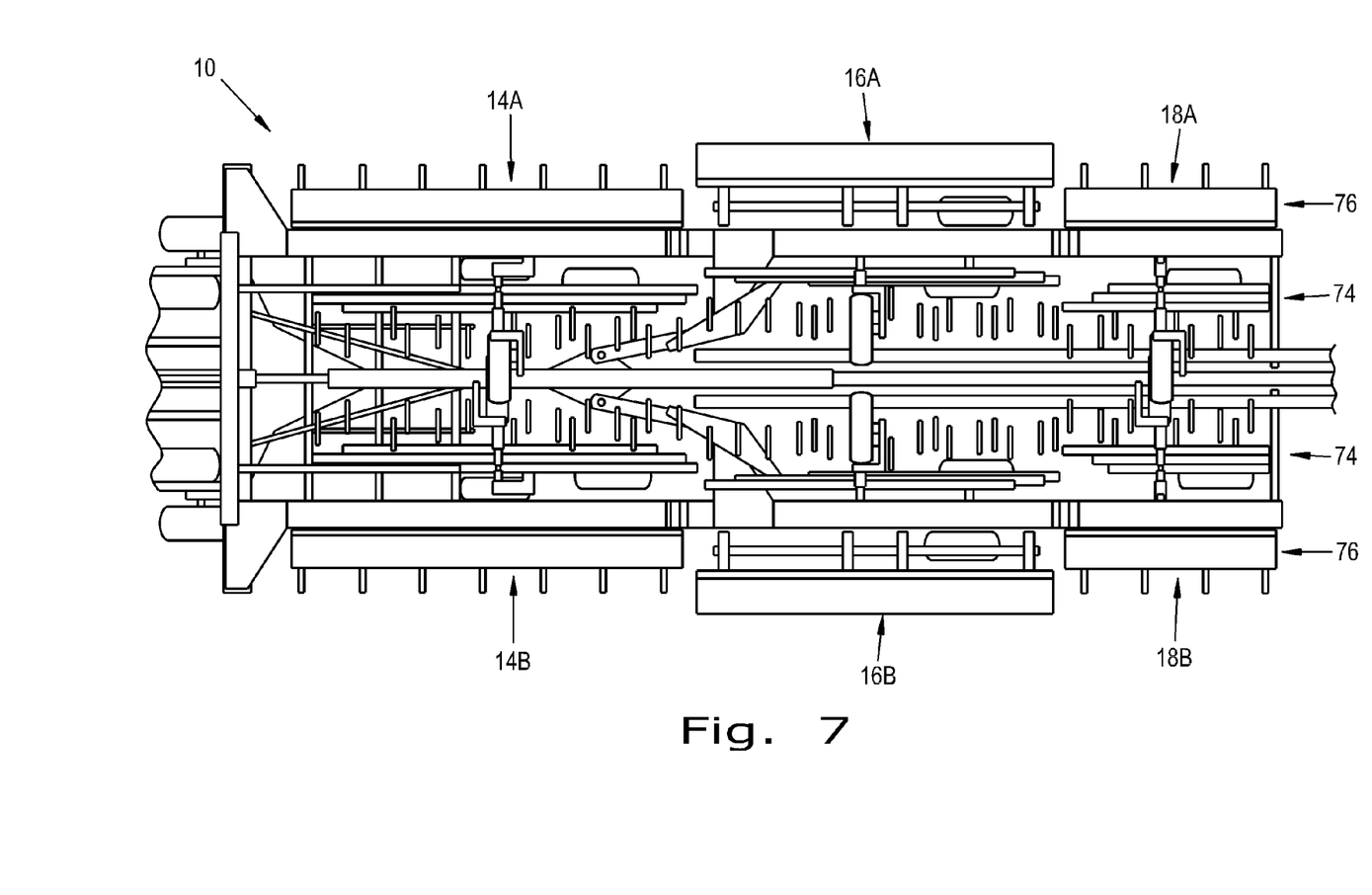
FIG. 7 is a top view of the tillage implement shown in FIGS. 1-6, further illustrating mismatched fold angles of the adjacent sections.

During use, it is periodically necessary to move the field cultivator 10 from an unfolded (operating) position to a folded (transport) position. Hydraulic cylinder 54 is first actuated to lift the rear lift wheels 52 to the raised transport position. Hydraulic cylinder 58 is then actuated to fold shank frame 28 up and over tool bar 24 to an inverted position rearward of tool bar 24 (FIGS. 2 and 4). Then the shank sections 66 of the wing sections 14, 16 and 18 are folded upwards to non-interfering positions that are generally vertical using hydraulic cylinders 68 (FIGS. 1, 2 and 4). Diagonally angled draft arms 72 extending between a forward end of pull hitch tube 20 and a respective tool bar 24 associated with the pair of middle wing sections 16A and 16B are then folded inward, and wing sections 14, 16 and 18 are then folded forward to a position adjacent pull hitch tube 20 (FIG. 6). Gauge wheel assemblies 56 at the front of center shank frame 28 and gauge wheel assemblies 70 at the front of wing sections 14, 16 and 18 are all configured as caster wheels and are not in contact with the ground when field cultivator 10 is in the folded or transport state. For unfolding the field cultivator 10 to the operating position, the reverse folding sequence is carried out.

In FIGS. 5-9, as fore tool frames 74 and aft tool frames 76 are folded upward, toward each other in each respective wing section, tool frames 74 and 76 are folded at different angles in each adjacent wing section. For example, wing sections 14A and 14B may be folded upward to a more forward position than the adjacent wing sections 16A and 16B. Wing sections 18A and 18B are also in a more forward configuration than sections 16A and 16B, and may be at an angle similar to sections 14A and 14B. The angles at which tool frames 74 and 76 are positioned may alternate at 83° and 93°, and/or may be approximately 10° apart from each other.

Figure 9:
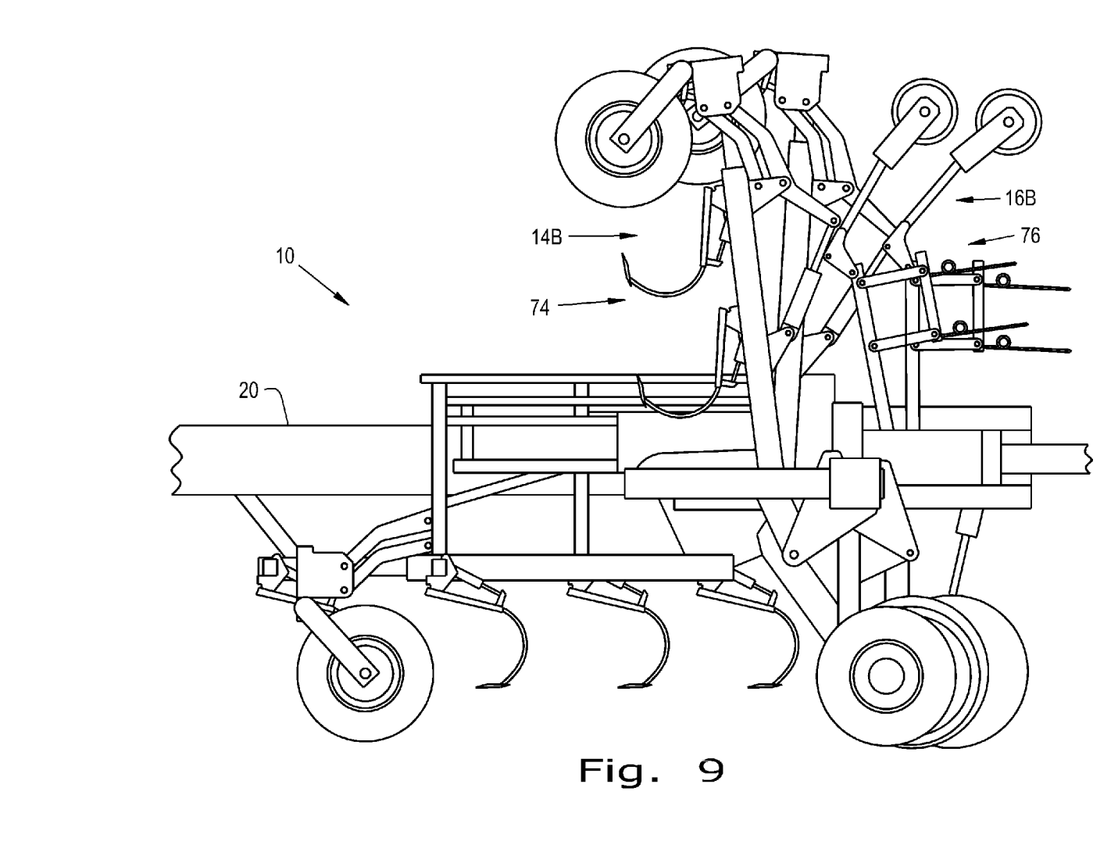
FIG. 9 is an end view of two adjacent wing sections of FIGS. 1-8 to further illustrate the present invention.

Looking at FIG. 9 it can be seen that the angle of fore tool frame 74 and the angle of aft tool frame 76 of each wing section may be approximately or generally supplementary for each wing section. It can also be said that each of the tool frames 74 and 76 are generally vertical, yet arranged so as to not interfere with each other in a transport mode. While it is contemplated that the arrangement of tool frames 74 and 76 could be achieved by a controlling of the amount of extension of hydraulic cylinders, the present invention is implemented by having linking members and/or brackets that are slightly different in length and/or the positioning of pivot points, in adjacent wing sections so that the hydraulic components fully deploy or retract to arrive at the mismatched configuration between adjacent wing sections, as described and claimed in this application.

Figure 8:
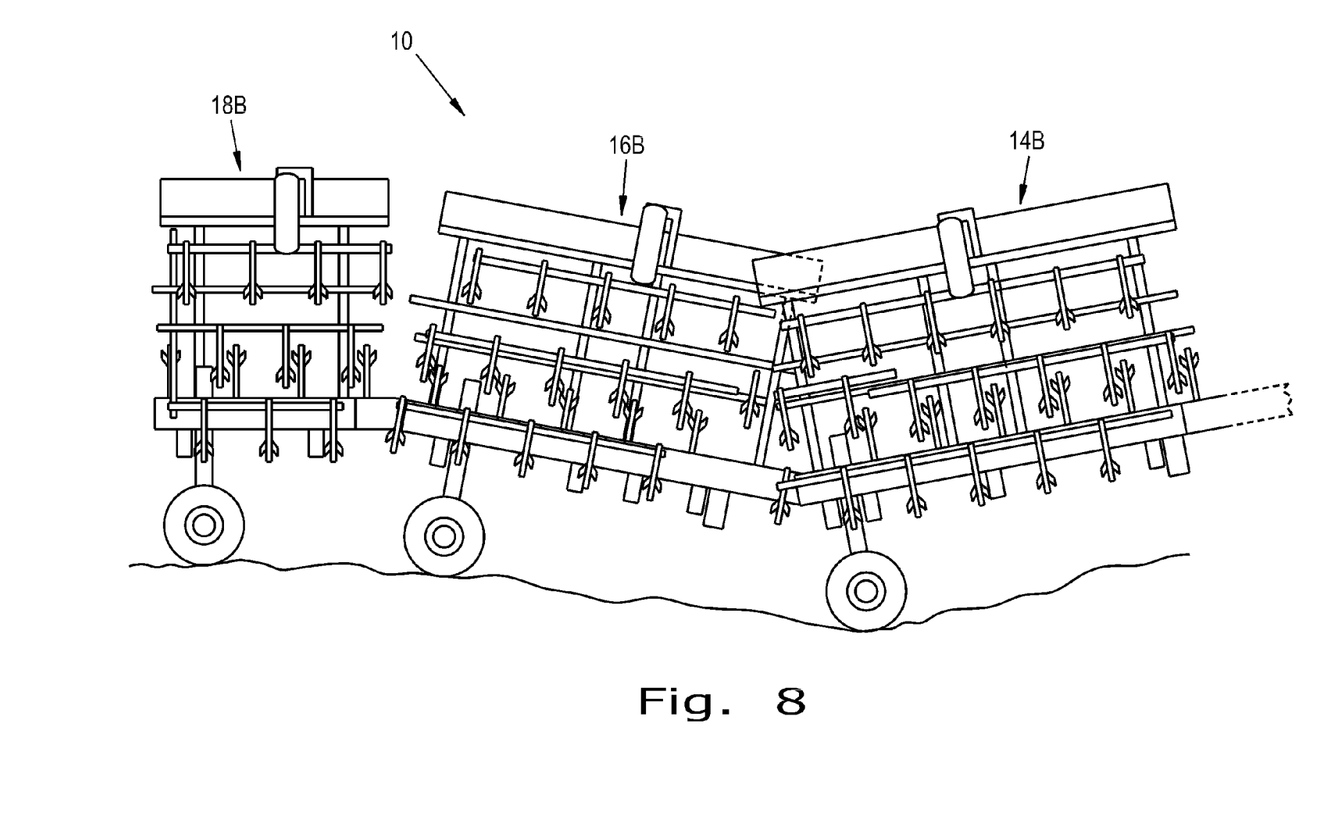
FIG. 8 is an illustration of the freedom of movement of the adjacent sections of FIGS. 1-7 when in a folded configuration.

In FIG. 8 it can be seen that since wing section 14B and wing section 16B have their respective fore and aft tool frames 74 and 76 situated as shown in FIGS. 5-7 and 9, that the tool frames 74 and 76 are positioned so as to not interfere with the adjacent counterparts when wing sections 14B and 16B are flexed or folded about a pivotal coupling therebetween. FIG. 8 illustrates just one side of the folded implement for the purpose of clarity. As implement 10 goes over the ground, variations such as waterways and humps in the ground are encountered, which would cause interference of the raised elements of implement 10, if not for the present invention. As can be seen in FIG. 8 the raised portions of wing sections 16B and 14B do not interfere where the dashed lines show the raised portion of 16B moving behind 14B since those portions are in different angled planes, which can be seen in FIGS. 7 and 9.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main frame section including a pull hitch tube extending in a travel direction, and a tool bar coupled with and extending transverse to said pull hitch tube; and
a plurality of pivotally coupled wing sections coupled with said main frame section including a first wing section and an adjacent second wing section, each of said plurality of wing sections having at least one pivotal tool frame, said pivotal tool frame of said first wing section being foldable upward at a first angle, said pivotal tool frame of said second wing section being foldable upward at a second angle, said first angle and said second angle being different, said at least one pivotal tool frame including a pivotal fore tool frame and a pivotal aft tool frame for both said first wing section and said second wing section.

2. The agricultural tillage implement of claim 1, wherein said first angle and said second angle both being generally vertical.

3. The agricultural tillage implement of claim 1, wherein said first angle and said second angle differ such that said pivotal tool frame of said first wing section and said pivotal tool frame of said second wing section do not interfere with each other when said first wing section and said second wing section are pivoted upwards toward each other.

4. The agricultural tillage implement of claim 1, wherein said fore tool frame of said first wing section is folded upward at said first angle, said fore tool frame of said second wing section being folded upward at said second angle, said aft tool frame of said first wing section being folded upward at a third angle, said aft tool frame of said second wing section being fold upward at a fourth angle, said third angle and said fourth angle being different.

5. The agricultural tillage implement of claim 4, wherein said first angle and said second angle are different by a sufficient amount such that said fore tool frame of said first wing section and said fore tool frame of said second wing section do not interfere with each other when said first wing section and said second wing section are pivoted upwards toward each other, said third angle and said fourth angle being different by a sufficient amount such that said aft tool frame of said first wing section and said aft tool frame of said second wing section do not interfere with each other when said first wing section and said second wing section are pivoted upwards toward each other.

6. The agricultural tillage implement of claim 5, wherein said first angle and said third angle are generally supplementary angles, said second angle and said fourth angle being generally supplementary angles.

7. The agricultural tillage implement of claim 5, wherein said third angle is approximately 93° and said fourth angle is approximately 83°.

8. The agricultural tillage implement of claim 5, wherein said third angle and said fourth angle differ by approximately 10°.

9. An agricultural tillage implement, comprising:
a main frame section including a pull hitch tube extending in a travel direction, and a tool bar coupled with and extending transverse to said pull hitch tube; and
a plurality of pivotally coupled wing sections coupled with said main frame section including a first wing section and an adjacent second wing section, each of said plurality of wing sections having at least one pivotal tool frame, said pivotal tool frame of said first wing section being foldable upward at a first angle, said pivotal tool frame of said second wing section being foldable upward at a second angle, said first angle and said second angle being different, wherein said plurality of wing sections includes three of said wing sections positioned adjacent to one side of said main frame section, and three of said wing sections positioned adjacent to an opposite side of said main frame section, each said pivotal tool frame being foldable to an angle that is different than an adjacent pivotal tool frame.

10. A series of at least two coupled wing sections for an agricultural field cultivator, said series of at least two coupled wing sections comprising:
a first wing section; and
a second wing section pivotally coupled to said first wing section, both said first wing section and said second wing section each having at least one pivotal tool frame, said pivotal tool frame of said first wing section being folded upward at a first angle, said pivotal tool frame of said second wing section being folded upward at a second angle, said first angle and said second angle being different, said at least one pivotal tool frame including a pivotal fore tool frame and a pivotal aft tool frame for both said first wing section and said second wing section.

11. The series of at least two coupled wing sections of claim 10, wherein said first angle and said second angle both being generally vertical.

12. The series of at least two coupled wing sections of claim 10, wherein said first angle and said second angle are different such that said pivotal tool frame of said first wing section and said pivotal tool frame of said second wing section do not interfere with each other when said first wing section and said second wing section are pivoted upwards toward each other.

13. The series of at least two coupled wing sections of claim 10, wherein said fore tool frame of said first wing section is folded upward at said first angle, said fore tool frame of said second wing section being folded upward at said second angle, said aft tool frame of said first wing section being folded upward at a third angle, said aft tool frame of said second wing section being fold upward at a fourth angle, said third angle and said fourth angle being different.

14. The series of at least two coupled wing sections of claim 13, wherein said first angle and said second angle are different by a sufficient amount such that said fore tool frame of said first wing section and said fore tool frame of said second wing section do not interfere with each other when said first wing section and said second wing section are pivoted upwards toward each other, said third angle and said fourth angle being different by a sufficient amount such that said aft tool frame of said first wing section and said aft tool frame of said second wing section do not interfere with each other when said first wing section and said second wing section are pivoted upwards toward each other.

15. The series of at least two coupled wing sections of claim 14, wherein said first angle and said third angle are generally supplementary angles, said second angle and said fourth angle being generally supplementary angles.

16. The series of at least two coupled wing sections of claim 14, wherein said third angle is approximately 93° and said fourth angle is approximately 83°.

17. The series of at least two coupled wing sections of claim 14, wherein said third angle and said fourth angle differ by approximately 10°.

\* \* \* \* \*